United States Patent
Tachibana

[11] 4,021,721
[45] May 3, 1977

[54] AC-TO-DC CONVERTER
[75] Inventor: Kyozo Tachibana, Naka, Japan
[73] Assignee: Hitachi, Ltd., Japan
[22] Filed: July 14, 1975
[21] Appl. No.: 595,730
[30] Foreign Application Priority Data
  July 15, 1974  Japan .............................. 49-80126
[52] U.S. Cl. ............................ 321/47; 323/DIG. 1; 318/345 E
[51] Int. Cl.² ...................................... H02M 7/155
[58] Field of Search ......................... 321/8, 18, 47; 323/DIG. 1; 317/DIG. 6; 318/341, 344, 345 E, 345 F, 345 G

[56] References Cited
UNITED STATES PATENTS

| | | | |
|---|---|---|---|
| 3,152,296 | 10/1964 | Meszaros | 321/47 X |
| 3,233,165 | 2/1966 | Bedford | 321/18 X |
| 3,388,312 | 6/1968 | Klein | 321/18 |
| 3,443,195 | 5/1969 | Hoffman, Jr. et al. | 321/18 X |
| 3,735,239 | 5/1973 | La Duca | 323/DIG. 1 |
| 3,911,324 | 10/1975 | Bishop | 321/47 X |

Primary Examiner—William M. Shoop
Attorney, Agent, or Firm—Craig & Antonelli

[57] ABSTRACT

A controlled AC-to-DC converter comprising a transformer having at least three taps including a center tap and first and second taps, a first thyristor whose cathode is connected to said first tap of said transformer, a second thyristor whose cathode is connected to said second tap of said transformer, a diode whose cathode is connected to said center tap of said transformer, a first output terminal connected to said cathode of said diode, a second output terminal connected to anodes of said first thyristor, said second thyristor and said diode, a D.C. output being produced across said first and second output terminals, and a retardation coil incorporated between said center tap and an electrical juncture between said cathode of said diode and said first output. In such converter, high harmonic frequency components generated in the A.C. current on the power source side are reduced without the disadvantage of the lowering of the efficiency.

8 Claims, 18 Drawing Figures ated which is connected so as to also function as a smoothing reactor effectively.

AC-TO-DC CONVERTER

FIELD OF THE INVENTION

This invention relates to an AC-to-DC converter circuit which can control the rectified output. More particularly, it relates to an AC-to-DC converter circuit which reduces the high frequency components of the current flowing on the power source side of the power transformer.

BACKGROUND OF THE INVENTION

In a prior-art AC-to-DC converter circuits employing thyristors or diodes, the output of the converter circuit or the rectified voltage as well as the rectified current pulsates under the influence of the AC voltage waveform of a power source, and hence, the pulsation is diminished by the use of a filter or a smoothing reactor. In this case, since the change of an AC current on the power source side of a transformer during the commutation period of the thyristor or diode is abrupt, high frequency components included in the AC current are large. Where the converter circuit is used for the control of a motor vehicle which is driven by the single-phase alternating current, these high frequency components can cause various problems including inductive disturbances to nearby communications equipment. In order to eliminate these problems, much effort has been expended up to now.

One method considered has been to moderate the change of the AC current on the power source side during the commutation period and to thus reduce the high harmonic frequency components included in the current. To this end, an inductance is incorporated into the AC circuit. However, when the inductance is made large, the power factor usually lowers to result in lowering the rectified voltage.

Where the supply voltage is, for example, sinusoidal, the change of the AC current on the power source side as attendant upon the commutation is abrupt when the commutation is executed near 90° in terms of the phase of the supply voltage, and it is moderate when the commutation is executed near 0° or 180°.

SUMMARY OF THE INVENTION

An object of this invention is to provide an AC-to-DC converter circuit which is free from the disadvantages stated above.

According to the AC-to-DC converter circuit of this invention, during the state when the rectified output is maximum or when the commutation is conducted near 0° in terms of the phase of the supply voltage, the inductance of a path through which the current flows at commutation is small, whereas during the other states, the inductances of paths through which currents flow at commutations are large. This enables the generation of high frequency components to be reduced without being accompanied by the disadvantage of lowered efficiency normally present in the case of utilizing an inductance. In addition, the utilization factor of the converter circuit is enhanced.

In the AC-to-DC converter circuit of this invention, electrical valves (thyristors) are incorporated having main electrodes of one polarity connected to respectively corresponding taps of a transformer and main electrodes of the opposite polarity connected to a common DC terminal, and a retardation coil is incorpo-

PREFERRED EMBODIMENTS OF THE INVENTION

Figure 1:
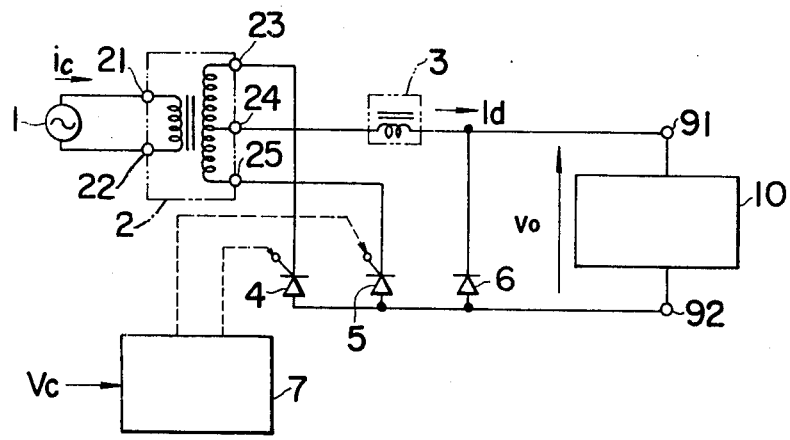
FIG. 1 is a circuit diagram of an AC-to-DC converter according to this invention.

FIG. 1 shows the fundamental circuit arrangement of an AC-to-DC converter according to this invention. As illustrated in the figure, the fundamental circuit of the AC-to-DC converter comprises a transformer 2 whose primary coil has its taps 21 and 22 connected to an AC power source 1 and whose secondary coil is provided with taps 23, 24 and 25, a thyristor 4 whose cathode is connected to the tap 23 of the secondary coil, another thyristor 5 whose cathode is connected to the tap 25 of the secondary coil, a diode 6 whose cathode is connected through a retardation coil 3 to the center tap 24 of the secondary coil, an output terminal 91 to which the cathode of the diode 6 is connected, and an output terminal 92 to which the anodes of the thyristors 4 and 5 and the diode 6 are connected. An inductive load, such as DC motor, 10 is connected across the output terminals 91 and 92. An ignition or firing control unit 7, having an input control signal $V_c$, generates striking or firing signals for the thyristors 4 and 5. The firing signals transmitted to the thyristors 4 and 5 have a phase difference of 180° between them.

Figure 2A:
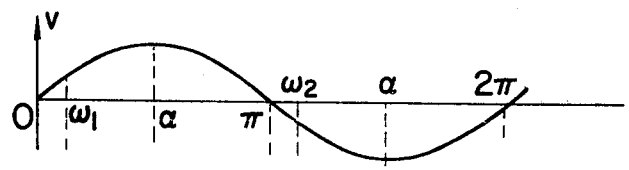
FIGS. 2(a) to 2(e) are graphs which show voltages and currents at various parts of the AC-to-DC converter according to this invention.

As shown in FIG. 2(a), the voltage of the power source 1 for feeding the primary coil of the transformer 2 with electric power varies sinusoidally.

Figure 2B:
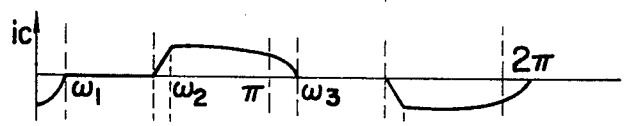
Figure 2C:
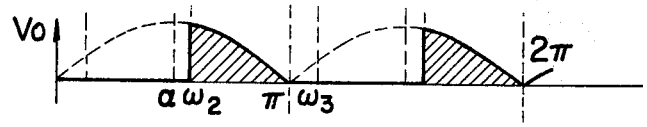
Figure 2D:

FIG. 2(b) depicts a current $i_c$ which flows through the primary coil of the transformer 2 when the thyristors 4 and 5 are fired at a firing angle $\alpha \approx 90°$, while FIG. 2(c) depicts a voltage $v_o$ between the output terminals 91 and 92 of the converter.

Figure 3A:
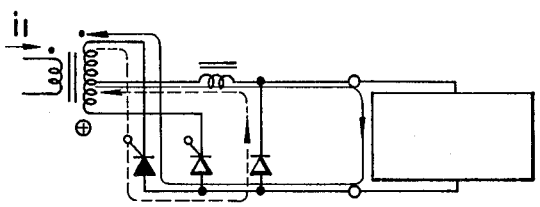
FIGS. 3(a) to 3(d) and FIGS. 4(a) and 4(b) are diagrams for elucidating the operation of the AC-to-DC converter according to this invention.

When, in the fundamental circuit of the converter, the ignition control unit 7 ignites the thyristors 4 and 5 at the firing angle close to 90° ($\alpha \approx 90°$), the operation proceeds as follows:

Referring to a period $0 - \omega_1$ in FIG. 2(a) illustrative of the voltage waveform of the power source 1, when the voltage is zero, a current which has flowed from the tap 24 of the secondary coil of the transformer 2 via the retardation coil 3, inductive load 10 and thyristor 4 to the secondary coil tap 23 till then as shown by a solid line in FIG. 3(a) is commutated into a current which flows from the secondary coil tap 23 via the thyristor 4, free wheel diode 6 and retardation coil 3 to the secondary coil tap 24 as shown by a broken line in FIG. 3(a). In consequence, a current which circulates through the free wheel diode 6 and the inductive load 10 flows as shown by a solid line in FIG. 3(b). Since the current at the commutation flows through the retardation coil 3 as indicated by the broken line in FIG. 3(a), the current through the primary coil of the transformer 2 decreases slowly and becomes zero as shown in FIG. 2(b).

Figure 3B:
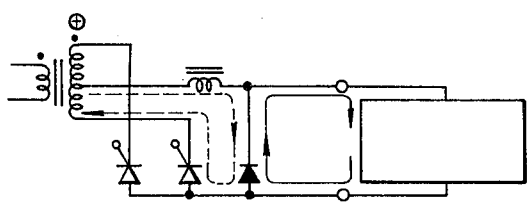

When, in a period $\alpha - \pi$, the ignition control unit 7 ignites the thyristor 5 at the firing angle $\alpha$ ($\approx 90°$), a current at a commutation flows from the secondary coil tap 24 via the retardation coil 3, free wheel diode 6 and thyristor 5 to the secondary coil tap 25 as shown by a broken line in FIG. 3(b), and the current having flowed through the free wheel diode 6 till then is shifted to the thyristor 5. When the current shifted to the thyristor 5 exceeds a hold-back current, the thyristor 5 turns "on" and a voltage is outputted across the output terminals 91 and 92 of the converter. Since the current at the commutation flows through the retardation coil 3, the current $i_c$ increases gently as shown in FIG. 2(b). As shown in FIG. 2(c), therefore, the output voltage across the output terminals 91 and 92 of the converter appears with a slight lag from the firing angle $\alpha$.

Figure 3C:
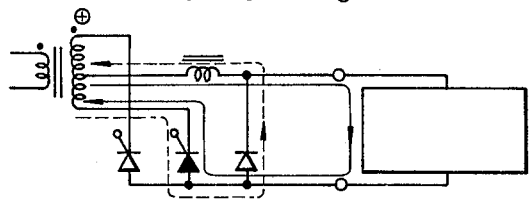
Figure 3D:
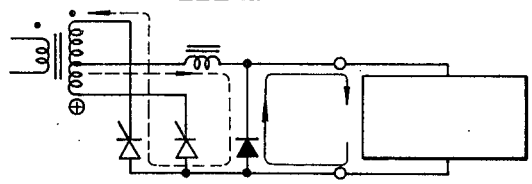

When the supply voltage thereafter changes to be negative (see FIG. 2(a)), the fundamental circuit of the converter operates in polarities opposite to those described above (see FIG. 2(b) and FIGS. 3(c) and 3(d)).

As apparent from the foregoing, in case where the output is the maximum, that is, where the control angle $\alpha$ is zero, the primary current $i_c$ is not moderated through the medium of the retardation coil 3. Therefore, the phase lag of the output voltage relative to the voltage of the power source 1 is small, and the power factor does not become reduced.

Figure 4A:
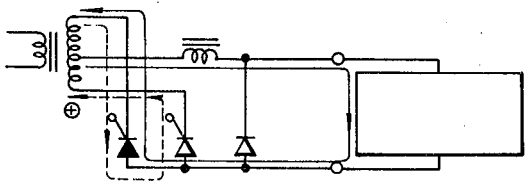
Figure 4B:
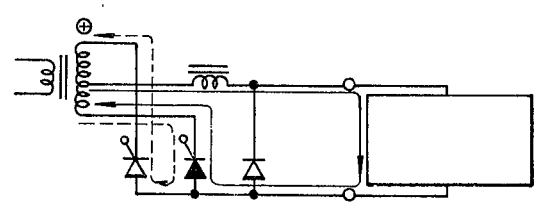

As apparent from FIG. 3 and FIG. 4, in the fundamental circuit of the AC-to-DC converter according to this invention, the current $I_d$ flowing through the retardation coil 3 is a direct current or pulsating current whose flow direction is fixed. The retardation coil 3 also functions to smooth the current $I_d$.

This invention consists of, as set forth above, a retardation coil incorporated in the fundamental circuit of the AC-to-DC converter including at least two thyristors and one diode. The aforecited advantages are thus achieved.

Figure 2E:
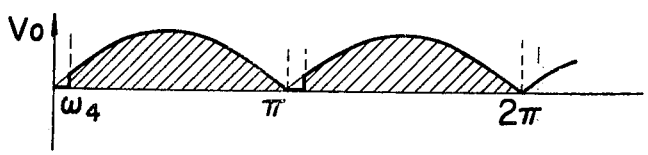

Moreover, in the fundamental circuit of the AC-to-DC converter according to this invention, the retardation coil functions effectively as a smoothing reactor for the rectification output. The rectification output $V_o$ in FIG. 2(c) or 2(e) is depicted on the supposition that the rectified direct current $I_d$ has been smoothed in a substantially perfect fashion. In general, however, some pulsation is allowed for the current $I_d$, and the capacity of the smoothing reactor is confined to the minimum as required. The current $I_d$ is closely related to the pulsating component of the rectified output voltage $V_o$.

Now, letting $e$ denote a voltage which is impressed on the retardation coil 3 acting also as the smoothing reactor, $i$ denote a current which flows therethrough and $L_d$ denote an inductance thereof, the variation gradient $di/dt$ of the current holds the following relation:

$$L_d \cdot di/dt = e$$

This equation indicates that, if the voltage $e$ applied to the reactor 3 is constant, the variation gradient $di/dt$ of the current will be smaller as the value of the inductance $L_d$ is larger. That is, referring to the waveforms of the current $i_c$ through the primary coil and the rectified output voltage $V_o$ as shown in FIGS. 2(b) and 2(c) respectively, the rectified output voltage $V_o$ abruptly rises at $\omega_2$, whereas the rectified output current $I_d$ is smoothed because it flows through the retardation coil 3 during the period $\alpha - \omega_2$.

Where the inductance of the retardation coil 3 functioning also as the smoothing reactor is made constant, the pulsation of such rectified output current $I_d$ increases with the mean value of the rectified output voltage $V_o$. As previously stated, however, as the inductance of the retardation coil 3 is larger, the period during which the rectified direct current $I_d$ flows through the retardation coil 3 becomes longer. For this reason, it is apparent that the smoothing effect of the retardation coil 3 for the rectified current is rational.

Figure 5:
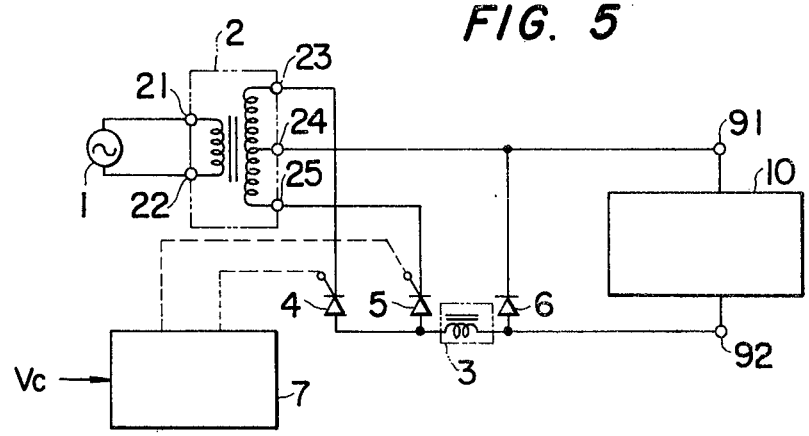
FIGS. 5, 6, 7, 9 and 10 illustrate further embodiments of this invention.
Figure 6:
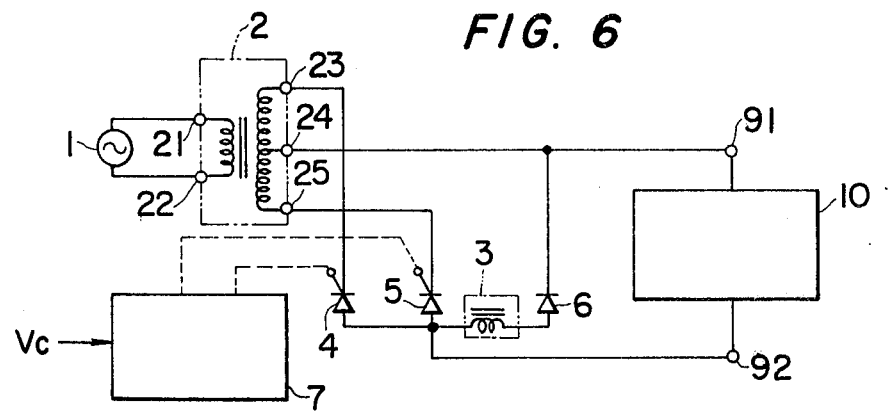

FIGS. 5 and 6 show further embodiments of the fundamental circuit arrangement of the AC-to-DC converter. A common feature of these embodiments is that the retardation coil 3 is connected between the anode of the thyristor 5 and the anode of the diode 6. As understood from FIG. 5 and FIG. 6, the operation of the retardation coil is the same as in the fundamental circuit of the AC-to-DC converter in FIG. 1. In the circuit of FIG. 5 the retardation coil 3 effectively functions also as a smoothing reactor for the rectified output current, whereas in the converter circuit of FIG. 6 the retardation coil 3 has no effective function as a smoothing reactor.

In the above, there have been explained the fundamental circuit arrangements of the AC-to-DC converter according to this invention. Hereunder will be explained circuits of applications as obtained by combining the fundamental circuits of this invention. As seen from the embodiments, a variety of AC-to-DC converters can be constructed by the combination of the fundamental circuits of this invention.

Figure 7:
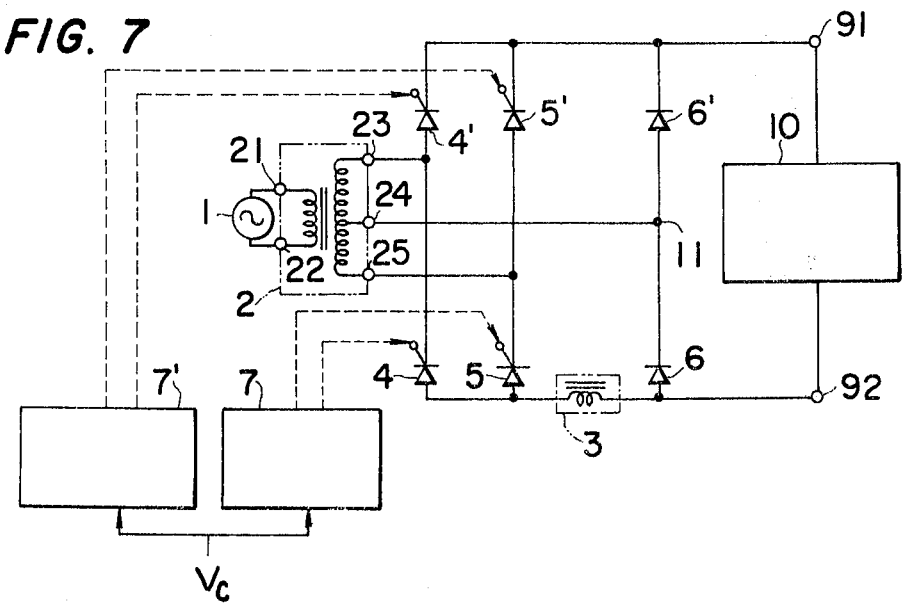
Figure 8:
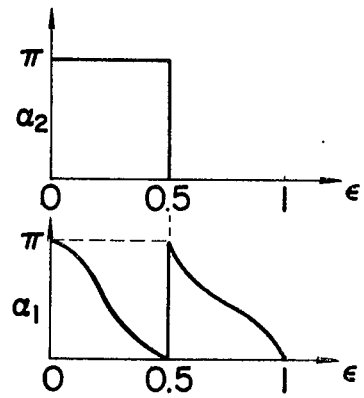
FIG. 8 is a graph for elucidating the operations of the two ignition control units of the AC-to-DC converter shown in FIG. 7.

Shown in FIG. 7 is an embodiment in which the first fundamental circuit of the AC-to-DC converter according to this invention comprises thyristors 4 and 5 and a diode 6 and the second fundamental circuit comprises thyristors 4' and 5' and diode 6' connected to taps 23, 24 and 25 of the secondary coil. As illustrated in the figure, a retardation coil 3 is interposed between the anode of the diode 6 and the juncture of the anodes of the thyristors 4 and 5. Since, in this embodiment, the connection from the tap 24 of the secondary coil to a point 11 is neutral, the two fundamental circuits of the AC-to-DC converter according to this invention exist above and below that connection. The thyristors 4 and 5 are ignited by an identical firing angle $\alpha_1$, while the thyristors 4' and 5' are ignited by another identical firing angle $\alpha_2$. The firing angles $\alpha_1$ and $\alpha_2$ are established by respective ignition control units 7 and 7' which are controlled by a signal $V_c$. In this case, it is desirable to control the firing angles $\alpha_1$ and $\alpha_2$ as in FIG. 8.

in FIG. 8, the axis of abscissas represents the normalized output voltage $\epsilon$ which is obtained by dividing the output voltages by their maximum value, while the axis of ordinates represents the firing angles $\alpha_1$ and $\alpha_2$ which are given in radian. As apparent from the figure, in case of controlling the output voltage sequentially from zero towards a higher voltage, the firing angle $\alpha_2$ is first made $\pi$, and the firing angle $\alpha_1$ is sequentially diminished from $\pi$. When the firing angle $\alpha_1$ reaches zero, the firing angle $\alpha_2$ is abruptly changed from $\pi$ to zero, and the firing angle $\alpha_1$ is abruptly changed from zero back to $\pi$. At this time, the control of the period of condition on the first and second fundamental circuits of the AC-to-DC converter are exchanged therebetween. The total period of condition, however, does not change because the retardation coil has no relation to the action of conduction at the phase angles of zero and $\pi$. Under such state, the firing angle $\alpha_1$ is controlled from $\pi$ again. When it arrives at zero, the period of conduction reaches the maximum. The first advantage of the control method is that, since the converter operates only under those conditions of the firing angles of the second fundamental circuit of the AC-to-DC converter equal to zero and $\pi$ under which essentially the higher harmonic components do not become large, only one retardation coil 3 may be used in the first fundamental circuit of the AC-to-DC converter. The second advantage is that the ignition control device requires only one phase shifter which is capable of the continuous phase control. Such system has hitherto been known as the so-called vernier control system. Further, there is produced an advantage peculiar to the cascade connection system or multiplex system consisting of a plurality of converter circuits, that is, an advantage of increases in the effects of enhancing the power factor, reducing the pulsation factor and reducing higher harmonics.

Figure 9:
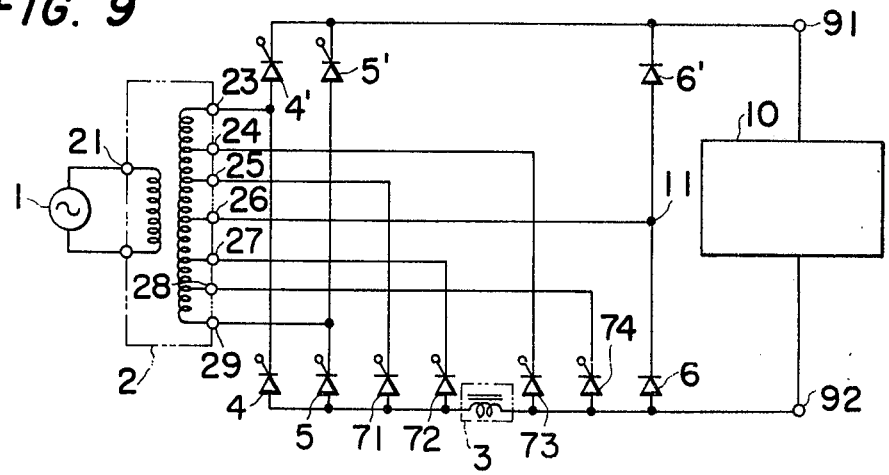

FIG. 9 shows another embodiment of application according to this invention. The ignition control units 7 and 7' and their respective connections to the thyristors have been omitted from the figure to improve clarity. The essential feature of this AC-to-DC converter is that intermediate taps 25, 27, 24 and 28 are disposed in addition to taps 23, 26 and 29 of the secondary coil and that thyristors 71, 72, 73 and 74 are further connected to the respective additional taps. The circuit part composed of the other taps 23, 29 and 26, the thyristors 4 and 5 and the diode 6, and the thyristors 4' and 5' and the diode 6' is quite the same as the circuit shown in FIG. 7. With this embodiment, the firing angles of the thyristors 4, 5, 4', 5', 73 and 74 are first made $\pi$, while the firing angles of the thyristors 71 and 72 are made equal and are continuously controlled from $\pi$ to zero. Upon arrival of the firing angles at zero, the firing angles of the thyristors 73 and 74 and subsequently those of the thyristors 4 and 5 are equally and continuously controlled from $\pi$ to zero in succession. When, in this way, the firing angles of the thyristors 4 and 5 reach zero at last, the situation is the same as the state in which the normalized output voltage E in FIG. 8 is 0.5. Here, the period of conduction output control at the normalized output voltage $\epsilon = 0.5$ are exchanged between the fundamental circuit of the AC-to-DC converter on the side of a negative terminal 92 with respect to the neutral points 26 and 11 and the fundamental circuit on the side of a positive terminal 91. Thereafter, the sequential phase control as stated above is executed again until the period of conduction reaches the maximum.

In this case, the diode 6 is used in common, and each pair of thyristors 71 and 72, thyristors 73 and 74 or thyristors 4 and 5 is combined therewith. Thus, each fundamental circuit of the AC-to-DC converter as described above is constructed. The diode 6 and each pair of thyristors constitute one set, and commutations are made among the sets. As to all the sets, accordingly, commutation currents flow through the retardation coil 3. Commutations arising at the phase angle of zero are performed in such manner that commutation currents do not flow through the retardation coil 3, and hence, the advantages which the retardation coil 3 has are not spoiled.

In accordance with such method, the voltages to be subjected to the phase control are inter-tap voltages. Therefore, the method is more effective for collectively decreasing the pulsation of the rectified voltage, increasing the power factor of the power source and decreasing higher harmonic currents included in the current of the power source. In order to obtain results, the single retardation coil suffices. As each additional pair of taps is added, two more thyristors become necessary.

Figure 10:
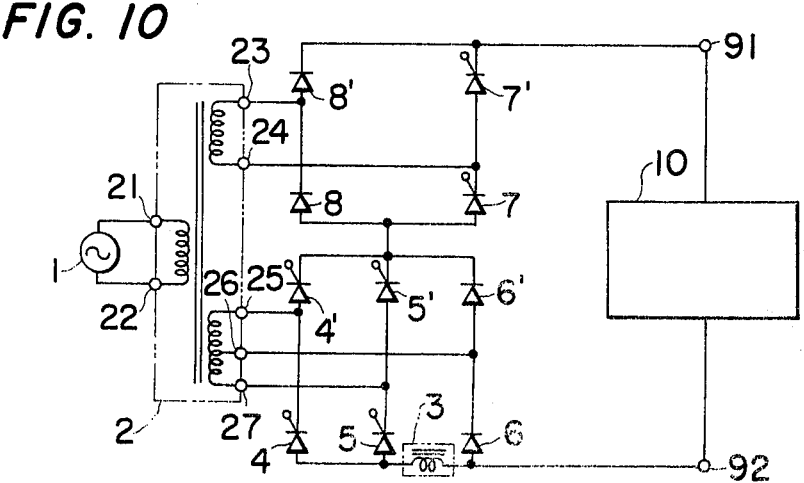

FIG. 10 shows another embodiment. The ignition control units 7 and 7' and their associated connections have again been omitted from this figure for clarity. In this circuit arrangement, a first converter circuit as in FIG. 7 is constructed for taps 25, 26 and 27 of a first secondary coil, while a second converter circuit of the bridge type is constructed of taps 23 and 24 of a second secondary coil, thyristors 7 and 7' and diodes 8 and 8'. The first and second converter circuits constitute the converter of the so-called multiple connection or cascade connection as has hitherto been extensively employed.

Such circuit is effective for reducing withstanding voltages of the respective arms of the converter because, even when a total voltage of all the coils on the secondary side of the transformer is great, a voltage produced by one coil lowers. It is more effective for decreasing the pulsation of the rectified voltage, increasing the power factor of the power source and decreasing the higher harmonic currents of the power source than the vernier control, as previously described, carried out between the two fundamental circuits of the AC-to-DC converter as connected to the taps 25, 26 and 27 of the first secondary coil and between the converter circuit connected to the taps 25, 26 and 27 and the converter circuit connected to the taps 23 and 24 of the second secondary coil.

All the embodiments in FIG. 7, FIG. 9 and FIG. 10 are constructed on the basis of the fundamental circuit of the converter in FIG. 5. In any of these embodiments, the retardation coil 3 produces the effect of the smoothing reactor. A construction based on the fundamental circuit of the converter in FIG. 1 or FIG. 6 achieves an equivalent effect.

This invention is applicable, not only to the foregoing embodiments, but also to a multiphase power source, an AC-to-AC converter such as cyclo-converter, a converter in which all or some of the electrical valves in the circuit arrangement of any of the embodiments are replaced with electrical valves with control electrodes, etc.

I claim:
1. A controlled AC-to-DC converter comprising:
   a transformer which is provided with at least three taps including a center tap and first and second taps led out symmetrically with respect to said center tap;
   a first thyristor whose cathode is electrically connected to said first tap of said transformer;
   a second thyristor whose cathode is electrically connected to said second tap of said transformer;
   a diode whose cathode is electrically connected to said center tap of said transformer;
   a first output terminal which is electrically connected to said cathode of said diode;
   a second output terminal which is connected to anodes of said first thyristor, said second thyristor and said diode, a DC output being produced across said first and second output terminals; and a retardation coil which is incorporated between said center tap and an electrical juncture between said cathode of said diode and said first output terminal.

2. A controlled AC-to-DC converter comprising:

a transformer which is provided with at least three taps including a center tap and first and second taps led out symmetrically with respect to said center tap;

a first thyristor whose cathode is electrically connected to said first tap of said transformer;

a second thyristor whose cathode is electrically connected to said second tap of said transformer;

a first diode whose cathode is electrically connected to said center tap of said transformer;

a first output terminal to which anodes of said first thyristor, said second thyristor and said first diode are electrically connected;

a third thyristor whose anode is electrically connected to said first tap of said transformer;

a fourth thyristor whose anode is electrically connected to said second tap of said transformer;

a second diode whose anode is electrically connected to said center tap of said transformer;

a second output terminal to which cathodes of said third thyristor, said fourth thyristor and said second diode are electrically connected, a DC output being provided across said first and second output terminals; and a retardation coil which is incorporated between said anode of said first diode and an electrical juncture between said anodes of said first and second thyristors.

3. A controlled AC-to-DC converter comprising:

a transformer provided with multiple taps, including a center tap and at least one pair of additional taps with respective taps of said pair being disposed on opposite sides of the center tap;

a plurality of thyristors, with the cathode of each thyristor electrically connected to a respective one of said additional transformer taps and the anodes of all said thyristors connected together;

a diode whose cathode is electrically connected to the center tap of said transformer and whose anode is connected to the junction of said thyristor anodes;

a retardation coil connected between the anode of said diode and the junction of said thyristor anodes, such that a DC output voltage is produced across said diode.

4. A controlled AC-to-DC converter comprising:

a transformer provided with multiple taps, including a center tap and at least one pair of additional taps with respective taps of said pair being disposed on opposite sides of the center tap;

a plurality of thyristors with the cathodes of each thyristor electrically connected to a respective one of said additional transformer taps and the anodes of all said thyristors connected together;

a diode whose cathode is connected to the center tap of said transformer and whose anode is connected to the junction of said thyristor anodes;

a retardation coil connected between the cathode of the diode and said center tap such that a DC output voltage is produced across said diode.

5. A controlled AC-to-DC converter comprising:

a transformer provided with multiple taps, including a center tap and at least one pair of additional taps with respective taps of said pair being disposed on opposite sides of the center tap;

a plurality of thyristors with the cathodes of each thyristor electrically connected to a respective one of said additional transformer taps and the anodes of all said thyristors connected together;

a diode whose cathode is connected to the center tap of said transformer and whose anode is connected to the junction of said thyristor anodes;

a retardation coil connected between said anode of said diode and the junction of said thyristors, such that a DC output voltage is produced between the diode cathode and the junction of said thyristor anodes.

6. A controlled AC-to-DC converter comprising:

a transformer provided with multiple taps, including a center tap and at least one pair of additional taps with respective taps of said pair being disposed on opposite sides of the center tap;

a first group composed of a plurality of thyristors, with the cathode of each thyristor electrically connected to a respective one of the said additional transformer taps and the anodes of all the thyristors connected together;

a second group composed of a plurality of thyristors, with the anode of each thyristor electrically connected to a respective one of the said additional transformer taps and the cathodes of all of the thyristors connected together;

a first diode whose cathode is connected to the center tap of said transformer;

a second diode whose cathode is connected to the junction of the cathodes of the second group of thyristors and whose anode is connected to the center tap of said transformer;

a retardation coil connected between the junction of the anodes of the first group of thyristors and the anode of the first diode such that a DC output is produced between the juncture of the cathodes of the second group of thyristors and the anode of the first diode.

7. A controlled AC-to-DC converter as in claim 6, comprising:

a plurality of additional pairs of taps in said transformer with respective taps of each said pair being disposed on opposite sides of the center tap;

a first additional group of thyristors whose anodes are connected to the juncture of the anodes of said first group of thyristors and whose cathodes are connected to predetermined ones of said additional transformer taps;

a second additional group of thyristors whose anodes are connected to the anode of said first diode and whose cathodes are connected to the remaining ones of said additional transformer taps.

8. A controlled AC-to-DC converter as in claim 6, comprising:

an additional winding on said transformer;

a first additional thyristor whose cathode is connected to one end of said additional winding and whose anode is connected to the junction of the cathodes of said second group of thyristors;

a second additional thyristor whose anode is connected to the cathode of said first additional thyristor;

a first additional diode whose cathode is connected to the remaining end of said additional winding and whose anode is connected to the anode of said first additional thyristor;

a second additional diode whose anode is connected to the cathode of said additional first diode and whose cathode is connected to the cathode of said second additional thyristor, such that additional DC output voltage is produced between the anode of said first diode and the cathode of said second additional diode.

* * * * *